Aug. 30, 1932. C. M. VOUGHT 1,874,666
AIRCRAFT
Original Filed June 23, 1928   2 Sheets-Sheet 1

INVENTOR
Chance M. Vought,
BY
Bartlett Eyre Scott & Keel
ATTORNEYS

Aug. 30, 1932.  C. M. VOUGHT  1,874,666
AIRCRAFT
Original Filed June 23, 1928  2 Sheets-Sheet 2

INVENTOR
Chance M. Vought,
BY
Bartlett Eyre Scott Keel
ATTORNEYS

Patented Aug. 30, 1932

1,874,666

UNITED STATES PATENT OFFICE

CHANCE MILTON VOUGHT, OF GREAT NECK, NEW YORK, ASSIGNOR, BY MESNE ASSIGNMENTS, TO CHANCE VOUGHT CORPORATION, OF HARTFORD, CONNECTICUT, A CORPORATION OF DELAWARE

AIRCRAFT

Original application filed June 23, 1928, Serial No. 287,748. Divided and this application filed January 29, 1930. Serial No. 424,182.

This invention relates to aircraft and particularly to aeroplanes.

The object of the invention is a special body nose construction for aircraft including a novel cowling construction with louvers contained therein for regulating and controlling the ventilation and cooling of the power plant of the craft. A still further object of the invention is a nose cowling construction which is of few parts and of simple, rigid and durable construction, and moreover which can be economically manufactured.

For a better understanding of the invention, reference may be had to the accompanying drawings forming a part of this application, wherein Fig. 1 is a three-quarter front view of an aeroplane embodying my invention;

Figure 1:
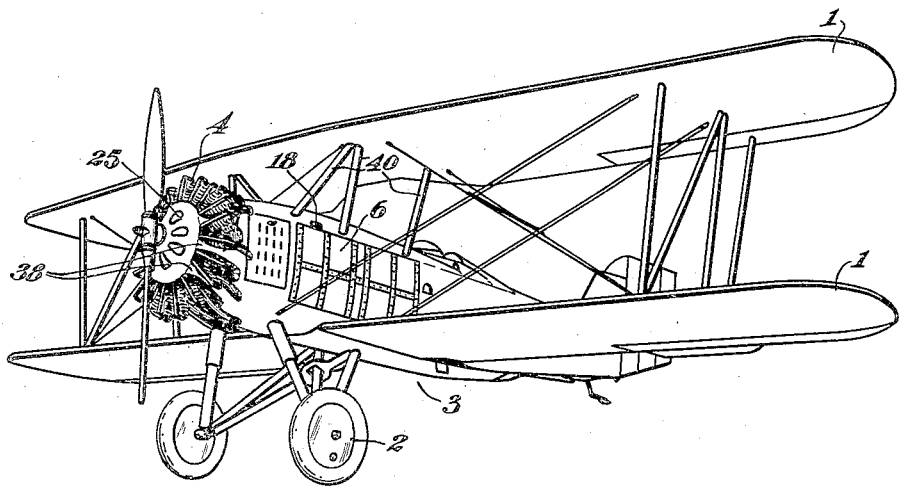

Referring to the drawings I have indicated my invention as embodied in an aeroplane having supporting wings 1, landing gear 2, a fuselage 3, and a power plant 4.

Figure 2:
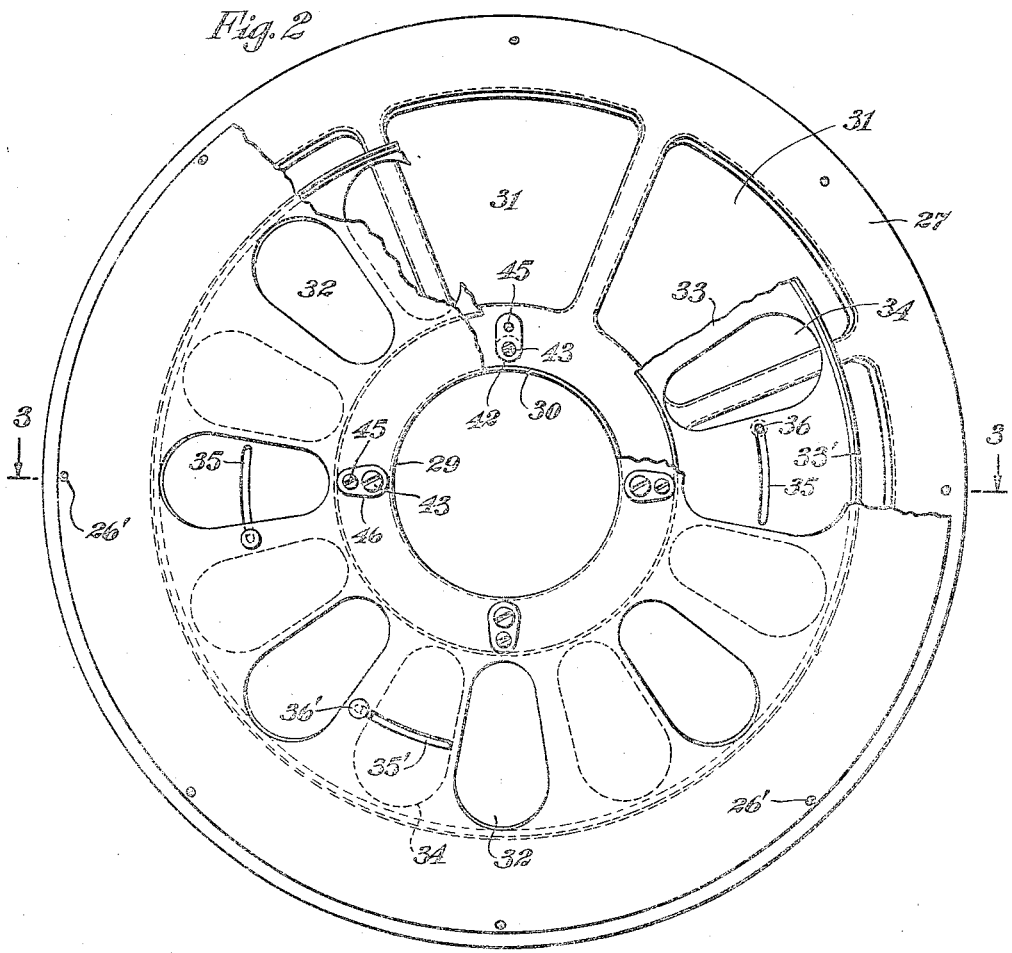
Fig. 2 is an enlarged front view of the nose of the fuselage.
Figure 3:
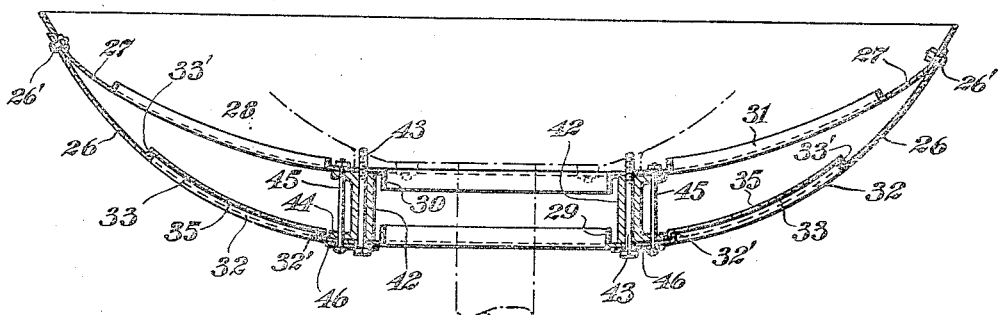
Fig. 3 is a section on the line 7—7 of Fig. 6.

The particular power plant 4 illustrated includes an air-cooled motor of the stationary cylinder and radial type which is mounted in the front part of the fuselage with its radially disposed cylinders arranged about the longitudinal axis of the fuselage, and the motor frame work carries a member 25 forming the nose cowling structure of the fuselage. This cowling structure is shown in detail in Figs. 2 and 3. It is of a composite construction including a front cowl member 26 and a rear cowl member 27, these two parts being spun from sheet metal into dish-shaped forms, with the peripheral edge 26' of the front cowl secured to the rear member 27 near its peripheral edge, these two cowls thus forming a rigid structure. These members 26 and 27 are formed with registering openings through their central parts and around these openings are formed inturned edges 29 and 30 for the purpose of adding rigidity to the structure. Four spacers 42 are disposed around the flanges 29 and 30, and securing screw bolts 43 pass through these spacers and are screw-threadedly attached to the motor frame. Each of the spacers is provided with flanges 44 at its ends and securing bolts 45 pass through the cowl members and the flanges and firmly secure them together into a rigid unit. Metal washers 46 are employed against which the bolt heads rest. The cowl member 27 is formed with radially extending ventilating openings 31 and the front cowl member is provided with corresponding ventilating openings 32, the openings 32 having inturned flanged edges 32' surrounding the same. The openings 32 are regulatable in size by an annular louver member 33 which has inturned peripheral edges 33' engaging the flanges 32' and serving as a guide for the relative rotary movement of the louver 33 and the cowl 26. The louver member 33 is formed from a single sheet of metal and is provided with openings 34 which are adapted to register with the openings 32 when the two are moved relatively to each other. The relative movement is limited by the length of the slots 35 formed in the louver member 33 which are traversed by the pins 36 carried by the cowl member 26. The nose cowling unit when secured in position forms a continuation of the streamline of the fuselage, streamline strips 38 passing between the motor cylinders and merging into the cowling. It is of light weight, simple construction and durable. The louver member 33 may be adjusted in any suitable manner, either by hand or automatically, as for example by a thermostatic means responsive to the temperature or heat of the motor. In the particular embodiment shown I have indicated a means 36' carried by the louver member 33 and projecting through a slot 35' formed in the member 26 for enabling a ready adjustment thereof.

This application is a division of my application Serial No. 287,748 filed June 23rd, 1928.

I claim:

1. A nose cowling for aircraft bodies including two sheet metal members spun into dish-shape and mated together with the peripheral edge of one sheet metal member firmly secured to the other member near its peripheral edge.

2. A nose cowling for aircraft bodies including two sheet metal members spun into dish-shape with the peripheral edge of one sheet metal member firmly secured to the other member near its peripheral edge, including spacers between the dish-like sheet metal members near their center.

3. A nose cowling for aircraft bodies including two sheet metal members spun into dish-shape with the peripheral edge of one sheet metal member firmly secured to the other member near its peripheral edge, including central registering openings formed in the two spun metal members with strengthening flanges turned up therearound and spacers firmly secured between the two sheet metal members adjacent said strengthening flanges.

4. A nose cowling for aircraft bodies including two sheet metal members spun into dish-shape with the peripheral edge of one sheet metal member firmly secured to the other member near its peripheral edge, the rear spun metal member being provided with relatively large ventilating openings and the front spun metal member being provided with smaller ventilating openings with a regulatable shutter adapted to regulate the size of the latter openings.

5. A nose cowling for aircraft bodies including two sheet metal members spun into dish-shape with the peripheral edge of one sheet metal member firmly secured to the other member near its peripheral edge, the rear spun metal member being provided with large ventilating openings and the front spun metal member being provided with smaller ventilating openings with a regulatable shutter adapted to regulate the size of the latter openings, said shutter being in the form of a sheet metal annular piece having annular guide flanges for guiding the same in its movements about flanges about the annular ring of ventilating openings.

6. A nose cowling for aircraft bodies including two sheet metal members spun into dish-shape with the peripheral edge of one sheet metal member firmly secured to the other member near its peripheral edge, including central registering openings formed in the two spun metal members and spacers firmly secured between the two sheet metal members adjacent the registering openings.

7. In an aircraft a streamlined body, a nose cowling for said body including a double sheet metal disc with registering openings formed in the spaced discs with means for regulating the size of one of said sets of registering openings, said disk being formed of two spaced mating sheet metal members having spacing devices and fastening means disposed near their center for fastening the sheets together and to the craft.

8. In an aeroplane, in combination, a fuselage, an air-cooled engine partly enclosed within said fuselage, a propeller driven by said engine, a shutter for regulating the air flow over and around said engine comprising two discs positioned rearward of said propeller and one said disc being located in advance of the other, each said disc being shaped to approximately the form of a segment of a sphere to provide at the forward end of said fuselage a streamline entry, and one said disc having a peripheral area substantially equal to the corresponding area of that section of the fuselage in advance of which it is mounted, and means operable to move one said disc relatively to the other.

9. In aircraft, in combination; an engine; a fuselage; a propeller shaft driven by said engine; a propeller secured to said propeller shaft; a shutter for regulating the air flow over and around said engine comprising two discs positioned intermediate said engine and said propeller, both of said discs being provided with an opening through which said propeller shaft extends and each of said discs being shaped to approximately the form of a segment of a sphere to provide at the forward end of said fuselage a streamline entry; and means operable to move one said disc relatively to the other.

10. In aircraft, in combination, a body, an engine partly enclosed within the said body, a propeller, a propeller shaft driven by said engine, and a shutter for regulating the air flow over and around the enclosed portion of said engine, said shutter comprising a part fixed in its relation to said body and shaped to provide at the nose end thereof a streamline entry, a part movable relative to said fixed part, each said part being intermediately located between said engine and said propeller and having formed therein a center opening through which said propeller shaft extends as well as one or more shutter openings for the passage of air, a supporting means for said movable part carried by said fixed part, and means for moving said movable part relative to said fixed part whereby the effective area of said one or more shutter openings may be varied.

11. A shutter for an engine of an aerial vehicle comprising two concentric discs each having formed therein a plurality of shutter openings, both of said discs being shaped to approximately the form of a segment of a sphere to provide in advance of said engine a streamline entry and one of said discs being fixed relatively to said engine, and means for rotating the other said disc relatively to the fixed disc whereby the effective area of the shutter openings may be varied.

12. In aircraft in combination, an air-cooled engine, a shutter positioned in advance of said engine for regulating the air flow over and around said engine, said shutter being shaped to approximately the form of a segment of a sphere to provide in advance of said engine a streamline entry and comprising a disc fixed relatively to said engine and a movable disc, and means for moving said movable disc for opening and closing said shutter.

13. In aircraft, in combination, a body having its nose portion shaped to provide a substantially streamline entry, said nose portion having formed therein a shutter opening for the passage of air, a propeller mounted forward of said nose portion, an engine mounted behind said nose portion, a propeller shaft driven by said engine and extended through said nose portion, a disc of substantially the same surface shape as said nose portion mounted in close proximity thereto, said disc likewise having formed therein a shutter opening for the passage of air, and means for moving said disc relatively to said nose portion whereby the effective area of said shutter opening may be varied.

14. In combination, an aeroplane, an air-cooled motor for the aeroplane, a shutter for said motor comprising a pair of discs each of said discs being shaped to substantially the form of a segment of a sphere, one of said discs being fixed with respect to the aeroplane and the other disc being rotatable with respect to the fixed disc, each of said discs having a substantially centrally located opening therethrough and shutter openings therein, and means for rotating one of said discs.

15. In aircraft, in combination; an engine; a fuselage; a propeller shaft driven by said engine; a propeller secured to said propeller shaft; a shutter for regulating the air flow over and around said engine comprising two discs positioned intermediate said engine and said propeller, both of said discs being provided with an opening through which said propeller shaft extends, as well as one or more shutter openings for the passage of air, and said discs being shaped to provide at the forward end of said fuselage a streamline entry; and means operable to move one said disc relatively to the other.

In testimony whereof, I have signed my name to this specification.

CHANCE MILTON VOUGHT.